(12) United States Patent
Wimmer

(10) Patent No.: US 8,919,799 B2
(45) Date of Patent: Dec. 30, 2014

(54) REAR WHEEL SUSPENSION FOR A VEHICLE, IN PARTICULAR A BICYCLE

(75) Inventor: Martin Wimmer, Hong Kong (CN)

(73) Assignee: MZ Motor Co., Ltd., Hong Kong (CN)

( * ) Notice: Subject to any disclaimer, the term of this patent is extended or adjusted under 35 U.S.C. 154(b) by 0 days.

(21) Appl. No.: 13/820,457

(22) PCT Filed: Sep. 2, 2010

(86) PCT No.: PCT/CN2010/076587
§ 371 (c)(1),
(2), (4) Date: Jun. 7, 2013

(87) PCT Pub. No.: WO2012/027900
PCT Pub. Date: Mar. 8, 2012

(65) Prior Publication Data
US 2013/0285346 A1    Oct. 31, 2013

(51) Int. Cl.
*B62K 25/28*   (2006.01)
*B62K 25/30*   (2006.01)

(52) U.S. Cl.
CPC ............... *B62K 25/28* (2013.01); *B62K 25/30* (2013.01); *B62K 25/286* (2013.01)
USPC ...................................................... 280/284

(58) Field of Classification Search
USPC ................................................. 280/275–284
See application file for complete search history.

(56) References Cited

U.S. PATENT DOCUMENTS

| 5,553,881 A | 9/1996 | Klassen et al. |
| 7,066,481 B1 | 6/2006 | Soucek |
| 2009/0261557 A1 | 10/2009 | Beale et al. |
| 2010/0109282 A1* | 5/2010 | Weagle .................... 280/284 |

FOREIGN PATENT DOCUMENTS

| CN | 1569552 A | 1/2005 |
| CN | 2880642 Y | 3/2007 |
| EP | 1980481 A1 | 10/2008 |

OTHER PUBLICATIONS

International Search Report prepared by the State Intellectual Property Office, the P.R. China, for International Application No. PCT/CN2010/076587.

* cited by examiner

*Primary Examiner* — Joseph M Rocca
*Assistant Examiner* — Gabriela C Craciun
(74) *Attorney, Agent, or Firm* — Sheridan Ross P.C.

(57) ABSTRACT

A rear wheel suspension for a vehicle, in particular a two-wheeled vehicle, specifically a bicycle (2) which is designed for a particularly great spring travel, comprises a pivot element (18) which is connected to a frame element (12) of the vehicle via a principal swivel joint (16), a swing arm rear suspension (6) which is connected to the pivot element (18) via an auxiliary pivot (20), a deflection element (46) which is pivotally mounted on a frame element (12), a hock absorber/spring element (52) which is mounted on the one hand on a frame element (14) and on the other hand on the deflection element (46), wherein the deflection element (46) is kinematically coupled to the swing arm rear suspension (6) via a pivotally mounted connecting element (38) and to the pivot element (18) via a pivotally mounted coupling element (60) in such a way that the end of the pivot element (18) facing the swing arm rear suspension (6) is pulled upwards on deflection of the rear wheel (8).

16 Claims, 3 Drawing Sheets

REAR WHEEL SUSPENSION FOR A VEHICLE, IN PARTICULAR A BICYCLE

CROSS REFERENCE TO RELATED APPLICATIONS

This application is a national stage application under 35 U.S.C. 371 and claims the benefit of PCT Application No. PCT/CN2010/076587 having an international filing date of 2 Sep. 2010, which designated the United States, the disclosure of which is incorporated herein by reference.

FIELD OF THE INVENTION

The invention relates to a rear wheel suspension for a vehicle and to a vehicle with a rear wheel suspension of this type. The vehicle is, in particular, a two-wheeled vehicle, specifically a bicycle.

BACKGROUND OF THE INVENTION

More and more bicycles have not only a sprung fork but also a sprung rear section. With rear wheel spring suspension of this type, the design requirements can well exceed those of a motorcycle. In contrast to a motorcycle, the chain of the chain drive is tensioned abruptly rather than continuously in the case a bicycle. Furthermore, a cyclist does not sit still on the seat, particularly when travelling over hilly terrain, and this can amplify undesirable vibrations of the spring system. In particular, when riding uphill "out-of saddle" high-amplitude vibrations or movements at the rear suspension may occur. In addition, the distance between bottom bracket and rear wheel axle changes during deflection in many bicycle suspension designs. As a result, depending on the design parameters of the rear suspension and the chosen gear, the chain is more or less tensioned, elongated or shortened, and the crank and the pedals tend to swivel back or forward somewhat under load. To minimise this so-called pedal kickback, diverse spring designs have already been conceived, which range from a simple driving swing arm through a supported single bar mechanism to what is known as the four-bar mechanism, specifically in the variant of what is known as the Horst link rear section (see, for example, WO 93/13974).

A common drawback of all these systems is that the achievable spring travel is generally restricted to a certain maximum value, if complex special solutions with other specific drawbacks are to be avoided. This is particularly of relevance for new-generation mountain bikes with comparatively big wheel diameters, for example 29 inches instead of the more common 26 inches.

SUMMARY OF THE INVENTION

The object of the present invention is to provide a rear wheel suspension of the type mentioned at the outset which provides a particularly great spring travel while still being of simple design and while providing a large degree of freedom in choosing suitable wheel diameters. In addition, the rear wheel suspension should allow balanced performance and, in particular, spring characteristics in different travel situations, in particular in the off-road area. Furthermore, the rear wheel suspension should allow straightforward adjustment or adaptation of the responsiveness or other parameters to individual cyclist requirements while at the same time meeting the most stringent requirements in running gear robustness. A further requirement is to avoid sensible pedal kickback or kickforth effects and the like.

This object is achieved according to the invention with a rear wheel suspension having the features of claim 1.

The rear wheel suspension accordingly comprises a pivot element which is connected to a frame element of the vehicle via a principal swivel joint, a swing arm rear suspension which is connected to the pivot element via an auxiliary pivot, a deflection element which is pivotally mounted on a frame element, a shock absorber/spring element which is mounted on the one hand on a frame element and on the other hand on the deflection element, wherein the deflection element is kinematically coupled to the swing arm rear suspension via a pivotally mounted connecting element and to the pivot element via a pivotally mounted coupling element in such a way that the end of the pivot element facing the swing arm rear suspension is pulled upwards on deflection of the rear wheel.

Particularly in the case of a bicycle, the frame element to which the pivot lever is hingedly linked via the principal swivel joint may be, in particular, a seat tube carrying a bicycle seat or a separate support tube between the front wheel steering link and said principal swivel joint, the support tube supporting a seat tube of this type. The principal swivel joint is preferably arranged at the lower end of the seat or support tube. The deflection element is preferably also pivotally hingedly linked to the same seat or support tube, preferably above the principal swivel joint. The spring/shock absorber element, on the other hand, is preferably fixed to a bicycle frame element located further forward in the direction of travel. The connecting element is preferably arranged above the pivot lever and, in particular, above the swivel point of the deflecting lever.

Advantageously, the pivot element is formed substantially as a straight rod at the front end of which the principal swivel joint is arranged and at the rear end of which the auxiliary swivel joint is arranged.

In a particularly expedient embodiment, the deflection element comprises an upper lever arm and a lower lever arm which is rigidly connected thereto, the deflection element being connected to the frame element via a swivel joint arranged in the region of the connection between the upper lever arm and the lower lever arm.

In an expedient development, the swivel joint connecting the deflection element to the frame element is arranged above the principal swivel joint.

In addition, the connecting element is preferably connected to the upper lever arm via a swivel joint.

In an advantageous embodiment, the shock absorber/spring element is at the same time also hingedly linked via the swivel joint connecting the connecting element to the upper lever arm.

Advantageously, the coupling element is connected on the one hand to the lower lever arm via a swivel joint and on the other hand to the pivot element via a swivel joint.

Expediently, the swivel joint connecting the coupling element to the pivot element is arranged in a central region of the pivot element between the principal swivel joint and the auxiliary swivel joint.

In an advantageous embodiment, moreover, the coupling element is formed substantially as a straight rod at the upper end of which is arranged the swivel joint for connection to the lower lever arm and at the lower end of which is arranged the swivel joint for connection to the pivot element.

In a preferred embodiment, the connecting element is connected to the swing arm rear suspension via a swivel joint arranged above the auxiliary swivel joint.

In an advantageous variant, the swing arm rear suspension comprises a triangular frame with a chain stay, a seat stay and a connecting stay connecting the chain stay to the seat stay. The seat stay is located above the chain stay, in other words is located closer to the seat than the chain stay which extends approximately level with the drive chain.

In an advantageous embodiment, the principal swivel joint, the auxiliary swivel joint and optionally the swivel joint connecting the rear wheel stay to the connecting element lie outside the outer circumference of the rear wheel. Expediently, this applies to all practical spring travels.

If, for all practicable spring travels, the auxiliary swivel joint is located outside the outer circumference of the rear wheel, a particularly preferred variant becomes possible in which the auxiliary swivel joint is simultaneously constructed as a bottom bracket for a pedal crank drive. Therefore, the bottom bracket is not located on the main frame of the bicycle but forms a unit with the resiliently mounted swing arm rear suspension. As a result, the distance from the rear wheel axle to the bottom bracket does not change on deflection, as with a simple drive rocker. Therefore, the available chain length remains constant over the whole spring travel, and the system does not experience sensible pedal movements, like kickback or the like. The spring characteristic is thus unaffected by the chain tension. Nevertheless, the multi-jointed suspension or support for the rear section makes it possible to adjust a particularly advantageous wheel deflection curve for the rear wheel with sensitive responsiveness of the spring suspension. In contrast to systems with simple drive rockers, the tendency to rock can be effectively avoided, without the overall spring suspension becoming too stiff.

In an advantageous embodiment, the rear wheel suspension is designed and adjusted in such a way that the rear wheel axle moves along an S-shaped (or backward S-shaped, depending on direction of view) wheel deflection curve on deflection of the rear wheel. The term wheel deflection curve refers to the trajectory over which the rear wheel axle moves during deflection relative to the vehicle frame.

It is particularly advantageous if the distance from the rear wheel axle to the principal swivel joint (and therefore to the main frame), connecting the frame to the pivot lever, increases continuously during deflection of the rear wheel, at least during the final section of the deflection, in particular during the final half of the corresponding spring travel.

The rear wheel suspension described here is most particularly suitable for a bicycle, but may in principle also be used on a motocross or off-road motorcycle or a general road motorcycle, with slight modifications which are within the purview of the person skilled in the art. In a particularly advantageous embodiment of this variant the chain of the chain drive driving the rear wheel is conducted around a shaft or an intermediate shaft whose axle is located along the lines of the bottom bracket axis in the case of a bicycle, as described above.

An embodiment of the invention is described in more detail with reference to drawings which are highly schematic views, are not to scale and in some cases omit a few components.

BRIEF DESCRIPTION OF THE DRAWINGS

Like parts are provided with like reference numerals in all figures.

LIST OF REFERENCE NUMERALS

| | |
|---|---|
| 2 | bicycle |
| 4 | bicycle frame |
| 6 | swing arm rear suspension |
| 8 | rear wheel |
| 10 | direction of travel |
| 12 | support tube |
| 14 | lower tube |
| 16 | swivel joint |
| 18 | pivot element |
| 20 | swivel joint |
| 22 | triangular frame |
| 24 | chain stay |
| 26 | seat stay |
| 28 | connecting stay |
| 29 | rear wheel bearing |
| 30 | rear wheel shaft |
| 32 | arrow |
| 34 | arrow |
| 36 | swivel joint |
| 38 | connecting element |
| 40 | arrow |
| 42 | swivel joint |
| 44 | upper lever arm (stay) |
| 46 | deflection element (lever) |
| 48 | arrow |
| 50 | swivel joint |
| 51 | arrow |
| 52 | shock absorber/spring element (MacPherson strut) |
| 54 | swivel joint |
| 56 | lower lever arm |
| 58 | swivel joint |
| 60 | coupling element |
| 62 | swivel joint |
| 64 | wheel deflection curve |
| 66 | rear wheel axle |
| 68 | bottom bracket shaft |
| 70 | bottom bracket |
| 72 | pedal crank |
| 74 | chain drive |
| 76 | bottom bracket axle |
| 78 | dropout |
| 80 | hoop |
| 82 | bottom bracket housing |
| 84 | pivot bearing housing |
| 86 | bearing recess |
| 88 | bearing recess |
| 90 | bearing recess |
| 92 | connecting rod |
| 94 | bearing recess |
| 96 | bearing recess |
| 98 | angle |
| 100 | angle |
| 102 | angle |
| 104 | angle |

DETAILED DESCRIPTION OF THE INVENTION

Figure 1:
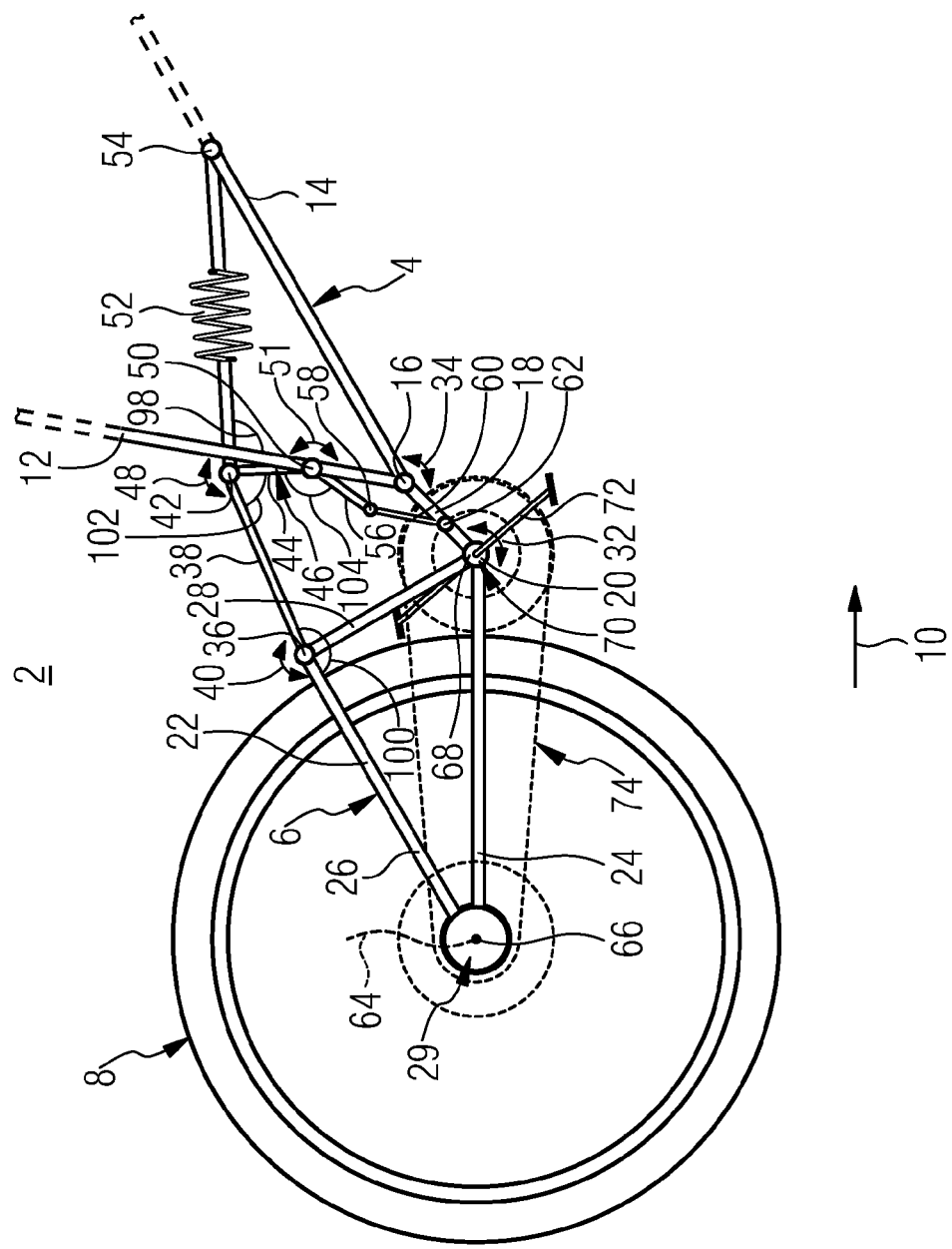
FIG. 1 is a side view of a sprung rear wheel suspension of a bicycle in the unloaded state.

The side view in FIG. 1 shows a detail of a bicycle 2 having a sprung swing arm rear suspension 6 mounted on a bicycle frame 4. The bicycle frame 4 is basically composed of pairs of parallel tubes (for example plastic or metal tubes), some of these pairs lying in a first frame plane and the others lying in a second frame plane parallel thereto. In FIG. 1, the tubes of the second frame plane are covered by the tubes of the first frame plane. Connecting stays, which extend perpendicularly thereto and are also invisible in FIG. 1, are located between the two frame planes. Similarly, the swing arm rear suspension 6 is composed at least in part of pairs of components which are arranged in parallel or symmetrically to one another, FIG. 1 showing only the part of these components located in front of the rear wheel 8 whilst the other part is concealed.

To simplify interpretation, reference will occasionally be made only to the components which are visible in FIG. 1. In the case of paired components, equivalent statements will apply to the others. The terms "front" and "rear" used in the present description conventionally refer to the direction of travel 10 of the bicycle 2. The terms "top" and "bottom" refer to the conventional operating position of the bicycle 2 on level ground, and the same applies to the relative positions "above" and "below".

The bicycle frame 4 of the bicycle 2 comprises a pair of support tubes 12 which are orientated approximately vertically and optionally also extend obliquely, the support tubes 12 at their upper end either carrying a bicycle seat (not shown here) directly or supporting a seat tube which carries the bicycle seat. In addition, the bicycle frame 4 comprises a pair of approximately diagonally, and optionally also horizontally orientated lower tubes 14. The respective lower tube 14 is connected at its lower end to the lower end of the support tube 12 allocated thereto, in particular is welded thereto. Alternatively, the bicycle frame 2 may also be designed as a tube or rod system produced in one piece.

In the region of the joint between support tube 12 and lower tube 14 there is a swivel joint 16 (principal swivel joint) on which a pivot element 18 (pivot lever) can be pivotally fixed by its front end. The swivel or pivot axis of the swivel joint 16 is orientated perpendicularly to the frame plane of the bicycle frame 4 and, in FIG. 1, is perpendicular to the plane of the drawing. At the rear end of the pivot element 18 there is a further swivel joint 20 (auxiliary swivel joint) with a swivel axis which is orientated parallel to the swivel axis of the swivel joint 16 and to which the actual swing arm rear suspension 6 is hingedly linked. The swing arm rear suspension 6 comprises two rigid triangular frames 22 which are located symmetrically on each side of the rear wheel 8, again only one of the two triangular frames 22 in turn being shown in the view in FIG. 1.

The respective triangular frame 22 comprises a chain stay 24 which extends approximately horizontally, a seat stay 26 which extends substantially obliquely thereto and a connecting stay 28, which are arranged in a rigid triangular configuration and are connected to one another. The rear wheel bearing 29 (shaft bearing) for the rear wheel shaft 30 is located in the region of the connection between the rear end of the chain stay 24 and the rear end of the seat stay 26. The connecting stay 28 connects the front end of the chain stay 24 in the region of the swivel joint 20 to the central or front region of the seat stay 26. Overall, therefore, the triangular frame 22 can be pivoted as a rigid unit with the rear wheel bearing in the direction of the arrow 32 about the swivel joint 20 arranged at the rear end of the pivot element 18, the pivot element 18 in turn being capable of pivoting at its front end via the swivel joint 16 in the direction of the arrow 34 about its suspension point on the vehicle frame 4.

However, the above-described pivoting movements cannot be performed completely freely and independently of one another, but are subject to some constraints:

At the front end of the respective seat stay 26, the rear end of a connecting element 38 (connecting lever) is in fact hingedly linked so as to pivot in the direction of the arrow 40 via a further swivel joint 36. Just like the swivel axes of the swivel joints to be described hereinafter, the swivel axis of the swivel joint 36 is orientated parallel to the swivel axis of the swivel joint 16. The front end of the connecting element 38 formed substantially as a straight rod is in turn connected so as to pivot in the direction of the arrow 48 via a swivel joint 42 to the upper lever arm 44 of a deflection element 46 (deflecting lever) formed in the manner of a rocker. The deflecting lever 46 is in turn connected so as to pivot in the direction of the arrow 51 at the lower end of the upper lever arm 44 via a swivel joint 50 to the pair of support tubes 12 of the bicycle frame 4.

Furthermore, the rear end of a shock absorber/spring element 52 is pivotally fastened to the swivel joint 42. The front end of the shock absorber/spring element 52 is pivotally fixed via a further swivel joint 54 to a frame element of the bicycle frame 4, for example to the lower tube 14 or to a support stay branching from the lower tube 14 (not shown in detail here). The shock absorber/spring element 52 formed, for example, in the manner of a conventional hydraulic shock absorber provides the desired restoring force during deflection of the rear wheel 8 and at the same time absorbs the associated vibratory processes.

In addition, the deflection element 46 comprises a lower lever arm 56 which is rigidly connected to the upper lever arm 44 and is therefore also pivotally hingedly linked via the swivel joint 50 to the support tube 12 of the bicycle frame 4 so that a pivoting movement imposed on the upper lever arm 44 is transferred to the lower lever arm 56 by means of the rigid coupling. At the lower end of the lower lever arm 56 there is a swivel joint 58 to which the upper end of a coupling element 60 (coupling lever) formed substantially as a straight rod is hingedly linked. The lower end of the coupling element 60 is in turn pivotally connected via a swivel joint 62 to the central region (or also to the rear end region located in the vicinity of the swivel joint 20) of the pivot element 18.

As a result, during the deflection of the rear wheel 8, a pivoting movement of the swing arm rear suspension 6 is transferred to the deflection element 46 which, in turn, reacts via the coupling element 60 on the pivot element 18 carrying the swing arm rear suspension 6 and pulls it upwards (in the direction of the seat). In other words, this design produces a coupling between the deflection element 46 loaded with the restoring force of the shock absorber/spring element 52 and the pivot element 18 connecting the swing arm rear suspension 6 to the bicycle frame 4. This results in a (backward) S-shaped wheel deflection curve 64, indicated schematically in FIG. 1, for the rear axle 66 of the rear wheel 8.

Figure 2:
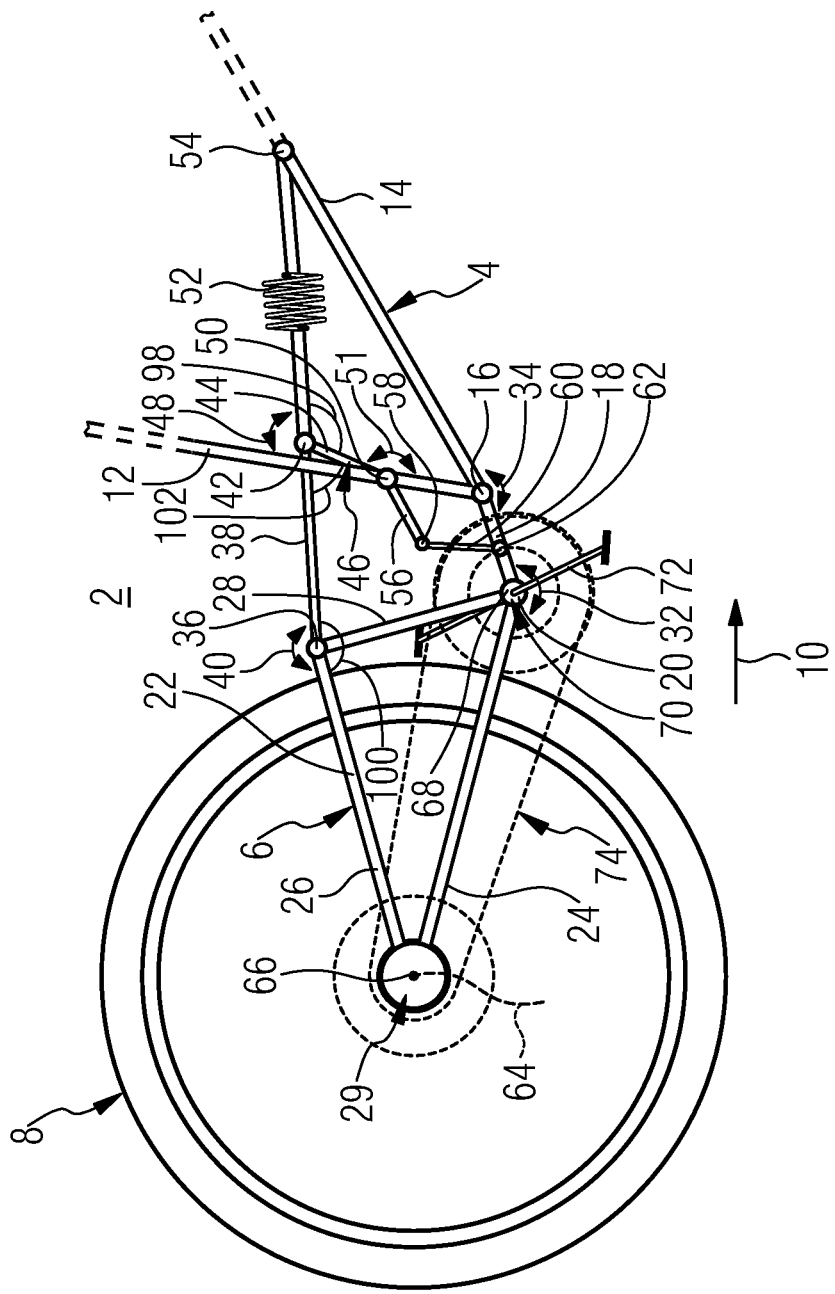
FIG. 2 shows the rear wheel suspension according to FIG. 1 in the deflected state.

The kinematics during the deflection of the rear wheel 8 are best illustrated by a comparison of FIG. 1 with FIG. 2, FIG. 1 showing the unloaded state of the sprung rear wheel suspension and FIG. 2 the state with maximum deflection. In an advantageous embodiment, the upper lever arm 44 of the deflection element 46 can move unobstructed past the upper extension of the support tube 12, and this allows particularly long spring travel (for example 240 mm in the case of a 29-inch rear wheel rim). A change in the length of the connecting element 38, which can be achieved relatively easily, results in greater opportunities for adjustment than in former systems.

In a particularly expedient embodiment, all swivel joints, in particular the swivel joints 20 and 36, as shown in FIG. 1 and FIG. 2, are located outside the outer circumference of the rear wheel 8 in all possible spring travel positions. As a result, in particular, the swivel joint 20 between swing arm rear suspension 6 and pivot element 18 can be formed as a bottom bracket 70 which in the conventional manner transfers (human) driving force imposed on a bottom bracket bearing 68 by means of pedal cranks 72 to the rear wheel 8 via a chain drive 74 only shown quite schematically here. In this embodiment, the distance between the bottom bracket axle 76 and the rear wheel axle 66 does not change during deflection of the rear wheel 8; instead, it remains constant. A pivoting movement of the bottom bracket 70 about the swivel joint 16, produced by the pivoting movement of the pivot element 18, does not inconvenience the cyclist, provided that the length and the attack angle (pitch) of the pivot element 18 is not excessively great. The pedal kickback or kickforth during deflection of the rear wheel on account of the varying distance between bottom bracket axis and rear wheel axle therein, known from other designs, is therefore basically prevented.

Figure 3:
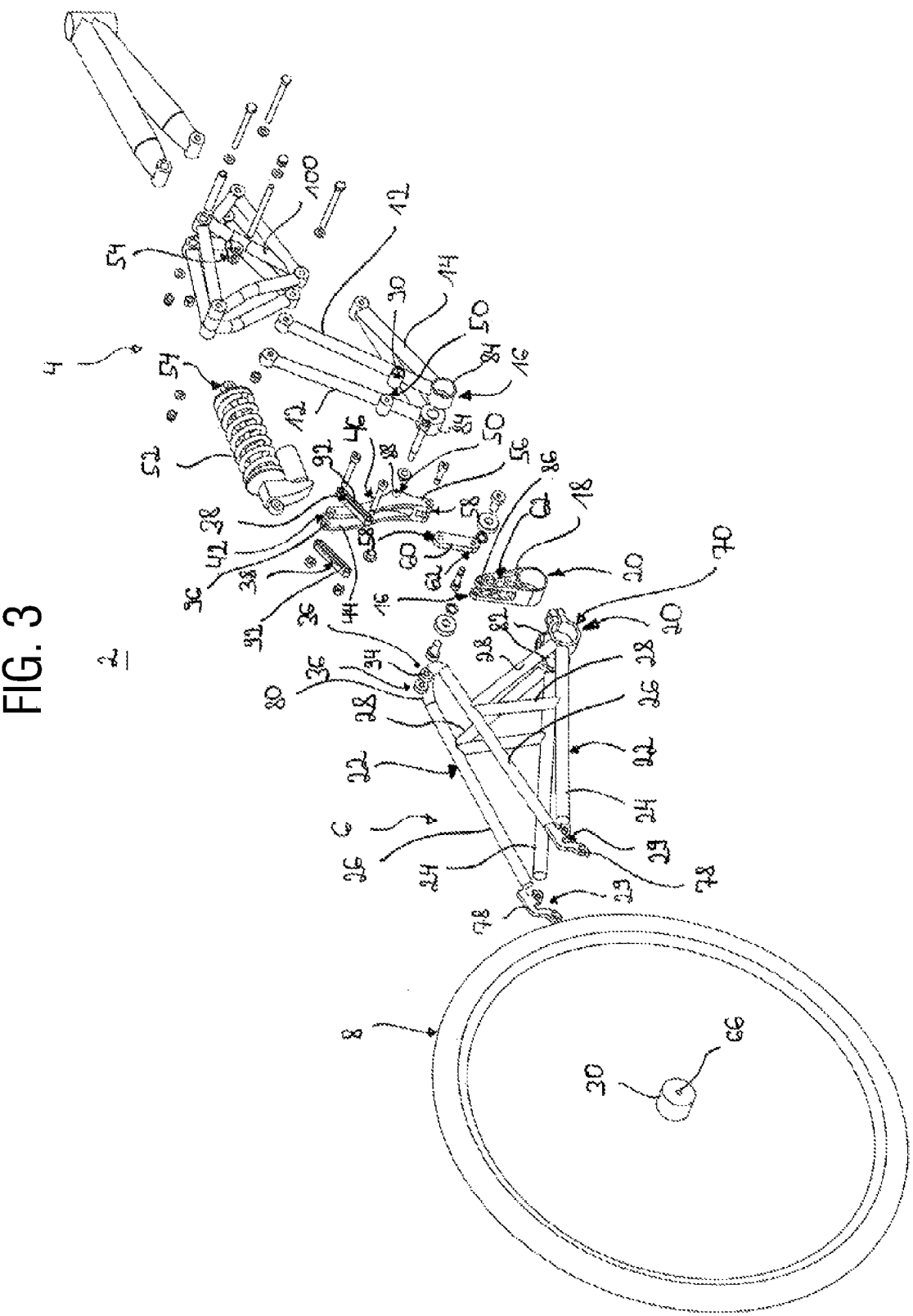
FIG. 3 is an exploded perspective view of the rear wheel suspension according to FIG. 1 and FIG. 2.

The exploded view in FIG. 3 shows a specific embodiment of further details of the rear wheel suspension. In contrast to the basic sketch in FIG. 1 and FIG. 2, the respective triangular frame 22 of the swing arm rear suspension 6 has not only one but two connecting stays 28 which provide increased robustness. The rear wheel shaft 30 is mounted, for example, in dropouts 78 of the seat stays 26 and/or the chain stays 24. At their front ends projecting beyond the outer circumference of the rear wheel 8, the two seat stays 26 are joined together by a U-shaped hoop 80 which carries the swivel joint 36. The front ends of the chain stays 24, which also project beyond the outer circumference of the rear wheel 8, are conceived as bottom bracket housings 82 for accommodating the bottom bracket shaft (not shown here).

In the assembled state, the bottom bracket shaft is placed through the right-hand and left-hand bottom bracket housing 82, the central part of the bottom bracket shaft located therebetween simultaneously forming the swivel joint 20 for the rear end of the pivot element 18 surrounding it and formed as a bearing recess (bearing bush). The front end of the pivot element 18, in the assembled state, similarly engages between the two joint bearing housings 84, arranged at the respective connection of support tube 12 and lower tube 14 of the bicycle frame 4, for the swivel joint 16 which is completed by a cardan shaft (not shown in FIG. 3) which is placed through the two joint bearing housings 84 and through the corresponding bearing recess 86 (bearing bush) of the pivot element 18.

In the assembled state, the deflection element 46 is similarly mounted by means of a cardan shaft (not shown), which is placed through the bearing recess 88 and through the associated bearing recesses 90 in/on the support tube 12 in the swivel joint designated in its entirety as 50 on the support tube 12, which is arranged above the swivel joint 16. The distance between the swivel axes of the swivel joints 16 and 50 roughly corresponds to the distance between the swivel axes of the swivel joints 16 and 20 of the pivot element 18. The two lever arms 44 and 56 of the deflection element 46 form an obtuse, almost flat (i.e. 180°) angle to one another. Since the deflection element 46 is fastened between the two support tubes 12, it can easily adopt the position shown schematically in FIG. 2 in the deflected state of the rear wheel suspension, in which position the upper lever arm 44 is located in front of the support tube 12 as viewed in the direction of travel 10, whereas it is normally located behind it in the unloaded state.

In the present embodiment, the connecting element 38 is formed by two connecting rods 92 which are connected by associated cardan shafts (not shown) at the rear end to corresponding bearing recesses 94 of the triangular frame 22 and at the front end to bearing recesses 96 of the upper lever arm 44 of the deflection element 46, so that the swivel joints 36 and 42 merely indicated schematically in FIG. 1 and FIG. 2 are embodied. Alternatively, it is also conceivable to use only a single connecting rod 92. Similarly, the coupling element 60 is produced by a coupling rod which is connected via a respective cardan shaft (not shown) to bearing recesses of the lower lever arm 56 to form the swivel joint 58 and to bearing recesses of the pivot element 18 to form the swivel joint 62. The distance between the swivel axes of the swivel joints 42 and 50 (corresponding to the effective length of the upper lever arm 44) is approximately twice as great as the distance between the swivel axes of the swivel joints 50 and 58 (corresponding to the effective length of the lower lever arm 56). The swivel joint 62 is arranged approximately centrally between the swivel joints 16 and 20 on the pivot element 18.

The swivel joint 42 between the connecting element 38 and the upper lever arm 44 of the deflection element 46 simultaneously serves for the pivotal mounting of the shock absorber/spring element 52 at its rear end. As with the other, already described joints, the pivotal connection is brought about here by means of a cardan shaft placed through corresponding bearing recesses. At the front end, the shock absorber/spring element 52 is pivotally fixed in an associated swivel bearing 54 on the bicycle frame 4 of the bicycle 2, and on a support stay 100 in this case. The details of the frame construction may differ markedly from the example shown here under certain circumstances.

Important features of the rear wheel suspension described hereinbefore are, in particular, specific lengths of the deflection lever, pivot and connecting lever and also the distances between the pivot bearings and angular positions thereof, which will be described in more detail hereinafter. This results in the realization of both a progressive force application curve in the relationship of the force/spring travel of the rear wheel to the shock absorber/spring element 52, also called a MacPherson strut, and a novel, backward S-shaped wheel deflection curve of the rear wheel relative to the frame.

The force characteristic of the spring force acting on the rear wheel through the suspension system is determined by that of the MacPherson strut 52 and the kinematics of the deflection lever. Starting from a MacPherson strut 52 which has, for example, a steel spring with a fixed bias, and therefore a characteristic which is linear over the force/spring characteristic, the progression of the system is determined predominantly by the angle 98 of the stay 44 of the deflection lever 46 to the MacPherson strut 52 and by the angle 100 of the stay 26 to the connecting element 38 and also the angle 102 of the connecting element 38 to the stay 44 of the deflection lever 46.

In order to obtain the maximum progressivity of the system, the angle 98 in the (non-deflected) starting position of the system should be between 30 degrees and 45 degrees, the angle 100 between 140 degrees and 150 degrees, and the angle 102 between 120 degrees and 110 degrees, the angles 98 and 100 increasing during deflection and the angle 102 decreasing.

An excessive progression of the overall system can be reduced by further preferred angular positions. In this case, the angle 98 in the starting position of the system should be between 40 degrees and 70 degrees, the angle 100 between 145 degrees and 170 degrees, and the angle 102 between 115 degrees and 95 degrees, the angles 98 and 100 increasing during deflection and the angle 102 decreasing.

In a further progressivity which satisfies most demands of travel, this is only small in design. In this case, the angle 98, in the starting position of the system, should be between 65 degrees and 80 degrees, the angle 100 between 165 degrees and 185 degrees, and the angle 102 between 95 degrees and 85 degrees, again the angles 98 and 100 increasing during deflection and the angle 102 decreasing.

The backward S-shaped rear wheel deflection curve 64 which is desirable for the great spring travel and the favourable ride is determined by the arrangement of the pivot point 50 of the deflection lever 46, the pivot point 16 of the connecting member 18, the pivot point 20 of the swing arm rear suspension 6 relative to the connecting member 18 and the angular position 104 of the lever arms 44 and 56 of the deflection lever 46 and also the respective length thereof. The length of the connecting member 18 and the angular position thereof to the Y-axis of the imaginary coordinate system, starting from the zero position of the pivot point 16, determine the maximum amplitude of the backward S-shaped wheel deflection curve. The connecting member 60 which, with its swivel points 58 and 62, connects the deflection lever 46 to the connecting member 18 is crucial for the mode of operation of the overall system. Here again, the length of the connecting member 60 and also the position of the connecting point 62 on the connecting member 18 is decisive so that the change in the wheel axle point 66 relative to the pivot point 16 of the main frame 4 is determined as a function of the load on the rear wheel.

A preferred arrangement of the overall system is described hereinafter, starting from a coordinate system with an X-axis and Y-axis, of which the origin is located at the swivel point 16 of the main frame 4 and a length in millimeters. In this case, the pivot point 50 of the deflection lever is in the range −30<X>+30 and +130<Y>+170. The length of the lever arm 44 is between 90 mm and 130 mm, more preferably between 100 mm and 120 mm. The length of the lever arm 56 is between 40 mm and 60 mm, more preferably between 45 mm and 55 mm. The angle 104 of the lever arms 44 and 56 of the deflection lever 46 is between 130 degrees and 160 degrees, more preferably between 138 degrees and 148 degrees. The length of the connecting member 18 is between 60 mm and 100 mm, more preferably between 70 mm and 90 mm, and the angular position thereof to the Y-axis starting from point 16 is between −140 degrees and −175 degrees, more preferably between −145 degrees and −160 degrees, so that the maximum amplitude of the backward S-shaped wheel deflection curve is produced.

The length of the connecting member 60 is between 40 mm and 60 mm, more preferably between 45 mm and 55 mm. The position of the connecting point 62 is determined as a percentage based on the length of the connecting member 18. Starting from the origin 16 of the coordinate system, the point 62 is between 35% and 65% of the length of the connecting member 18, more preferably between 45% and 55%.

The newly developed rear wheel suspension has been described in the present case for use in a bicycle (which is operated by muscle power), in particular a mountain bike or trekking bicycle. However, it is also suitable for motocross or off-road motorcycles with combustion or electric drive. In this case, the pedal crank drive is obviously dispensed with. Instead of the chain drive, a cardan drive or the like can then optionally also be provided. This does not affect the above-described principles of the rear wheel suspension.

The invention claimed is:

1. A rear wheel suspension for a vehicle comprising:
a pivot element which is connected to a frame element of the vehicle via a principal swivel joint, a swing arm rear suspension which is connected to the pivot element via an auxiliary swivel joint, a deflection element which is pivotally mounted on the frame element, a shock absorber/spring element which is mounted on one end on the frame element and on another end on the deflection element, wherein the deflection element is kinematically coupled to the swing arm rear suspension via a pivotally mounted connecting element and to the pivot element via a pivotally mounted coupling element in such a way that an end of the pivot element facing the swing arm rear suspension is pulled upwards on deflection of the rear wheel,
wherein the deflection element comprises an upper lever arm and a lower lever arm which is rigidly connected thereto, the deflection element being connected to the frame element via a third swivel joint arranged in a region of the connection between the upper lever arm and the lower lever arm,
wherein the coupling element is connected on one end to the lower lever arm of the deflection element via a fourth swivel joint and on another end to the pivot element via a fifth swivel joint, and
wherein the fifth swivel joint connecting the coupling element to the pivot element is arranged in a central region of the pivot element between the principal swivel joint and the auxiliary swivel joint.

2. The rear wheel suspension according to claim 1, wherein the pivot element is formed substantially as a straight rod, at a front end of which the principal swivel joint is arranged and at a rear end of which the auxiliary swivel joint is arranged.

3. The rear wheel suspension according to claim 1, wherein the third swivel joint connecting the deflection element to the frame element is arranged above the principal swivel joint.

4. The rear wheel suspension according to claim 1, wherein the connecting element is connected to the upper lever arm via a sixth swivel joint.

5. The rear wheel suspension according to claim 4, wherein the shock absorber/spring element is at the same time hingedly linked via the sixth swivel joint connecting the connecting element to the upper lever arm.

6. The rear wheel suspension according to claim 1, wherein the coupling element is formed substantially as a straight rod at an upper end of which is arranged the fourth swivel joint for connection to the lower lever arm and at a lower end of which is arranged the fifth swivel joint for connection to the pivot element.

7. The rear wheel suspension according to claim 1, wherein the connecting element is connected to the swing arm rear suspension via a seventh swivel joint arranged above the auxiliary swivel joint.

8. The rear wheel suspension according to claim 1, wherein the swing arm rear suspension comprises a triangular frame with a chain stay, a seat stay and a connecting stay connecting the chain stay to the seat stay.

9. The rear wheel suspension according to claim 7, wherein the principal swivel joint, the auxiliary swivel joint and optionally the seventh swivel joint connecting the swing arm rear suspension to the connecting element lie outside an outer circumference of the rear wheel.

10. The rear wheel suspension according to claim 1, wherein the auxiliary swivel joint is simultaneously constructed as a bottom bracket for a pedal crank drive.

11. The rear wheel suspension according to claim 1, wherein a distance from a rear wheel axle to the principal swivel joint increases continuously on deflection of the rear wheel, at least during a final section of the deflection, in particular during a final half of the corresponding spring travel of the shock absorber/spring element.

12. The rear wheel suspension according to claim 1, wherein a rear wheel axle moves along an S-shaped wheel deflection curve on deflection of the rear wheel.

13. A vehicle, in particular a two-wheeled vehicle, specifically a bicycle comprising a rear wheel suspension according to claim 1.

14. The rear wheel suspension according to claim 8, wherein the connecting stay connects a front end of the chain stay in a region of the auxiliary swivel joint to a front region of the seat stay such that the triangular frame is pivotable as a rigid unit about the auxiliary swivel joint.

15. The rear wheel suspension according to claim 1, wherein the swing arm rear suspension comprises a chain stay that is connected on one end to the pivot element via the auxiliary swivel joint and on another end to a rear wheel axle.

16. The rear wheel suspension according to claim 15, wherein the auxiliary swivel joint is simultaneously constructed as a bottom bracket for a pedal crank drive, and the distance between the bottom bracket and the rear wheel axle is constant during deflection of the rear wheel.

* * * * *